Oct. 23, 1928.
H. S. HOLMES
MAKING HUBS AND THE LIKE
Filed June 4, 1927
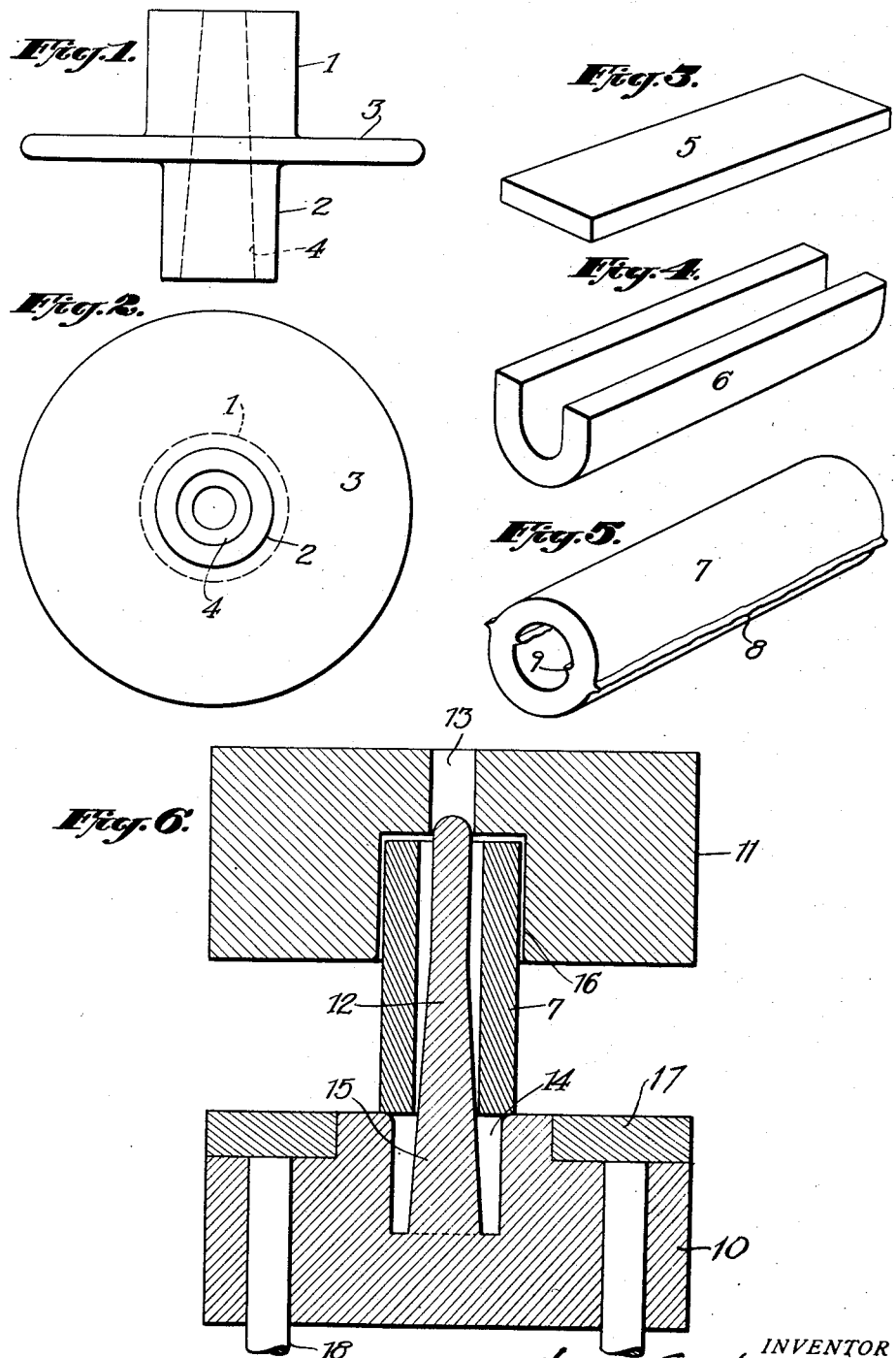

Patented Oct. 23, 1928.

1,688,421

UNITED STATES PATENT OFFICE.

HENRY S. HOLMES, OF NEW YORK, N. Y., ASSIGNOR TO THOMAS E. MURRAY, OF BROOKLYN, NEW YORK.

MAKING HUBS AND THE LIKE.

Application filed June 4, 1927. Serial No. 196,451.

The usual method of making hubs for automobile wheels is to drop forge a solid piece of steel and then drill the hole for the shaft. The drilling operation is expensive and the material drilled out is wasted. My invention provides an improved and more economical method of making such hubs and similar articles.

The accompanying drawings illustrate embodiments of the invention.

Fig. 1 is a side elevation of the completed article;

Fig. 2 is an underside plan of the same;

Figs. 3, 4 and 5 are perspective views of the initial blank and intermediate shapes produced;

Fig. 6 is a longitudinal section illustrating a forging operation.

The hub, as shown in Fig. 1, has cylindrical portions 1 and 2 of different diameters between which is a flange portion 3 for attachment of spokes, wires or discs. A tapered hole 4 for receiving the driving shaft extends from end to end of the hub.

I start with flat rectangular blanks 5, Fig. 3, and bend them to circular segments 6, Fig. 4. Two such segments are then butt welded together along their longitudinal edges to form a thick tube 7, Fig. 5. Preferably the Murray method of welding is used in which the parts are pressed together while current of high density is passed across the joint. A certain amount of metal is extruded in the form of rough burr or flash 8 and 9 on the outside and inside of the joints. The inside burrs are removed by broaching. The outside burrs may also be removed if desired by cutting or grinding them off, leaving a smooth thick tubular blank for the next, forging, operation. A single blank, instead of the two segments shown, can be bent around the circular shape and similarly welded to form the desired tubular blank.

The tubular blank is then heated and placed in the forging machine illustrated in Fig. 6. The die 10 is supported on the bed of a stamping press to the movable ram of which the punch 11 is fastened. The tubular blank 7 is placed over the rod or plug 12 which extends up from the die; the punch 11 being raised. The plug 12 enters a hole 13 in the punch before the latter begins to work, so as to prevent breakage of the plug. When the ram forces the punch 11 down, the metal is forced into the recess 14 in the die and the tapered hole is formed by the tapered portion 15 of the plug. The upper part of the blank is forced into the recess 16 of the punch. The punch is forced down and is stopped at about one-quarter of an inch above the top of the die, or whatever distance corresponds to the thickness of the desired flange. When the punch is raised a knock-out ring 17 is lifted by the pins 18 to lift the hub off the plug. The shape produced is that shown in Figs. 1 and 2.

By the method described there is a considerable saving of metal since there is no scrap. Flat steel is comparatively inexpensive and can be sheared cheaply to the exact length desired for the tubular blank.

Modifications may be made by those skilled in the art without departing from the invention as defined in the following claims.

What I claim is:

1. The method of making a wheel hub having a longitudinal tapered bore which consists in forming a tubular blank with a welded longitudinal joint and forging such blank to form the cylindrical external shape and the tapered bore.

2. The method of making a wheel hub having a longitudinal tapered bore which consists in bending flat blanks to segmental shape, uniting such segments by welding along longitudinal edges to form a tubular blank and forging such blank to form the external shape and the tapered bore.

3. The method of making a wheel hub having a longitudinal tapered bore which consists in forming a tubular blank with a welded longitudinal joint and a cylindrical bore and forging such blank to form the external shape and the tapered bore.

In witness whereof, I have hereunto signed my name.

HENRY S. HOLMES.